(12) United States Patent
Houle et al.

(10) Patent No.: US 11,571,758 B2
(45) Date of Patent: Feb. 7, 2023

(54) METHOD OF CLEANING BLADE OF LOG SAW

(71) Applicant: Paper Converting Machine Company, Green Bay, WI (US)

(72) Inventors: Scott K. Houle, Green Bay, WI (US); Cory P. Gussert, Pulaski, WI (US); Joseph A. Blume, Green Bay, WI (US)

(73) Assignee: Paper Converting Machine Company, Green Bay, WI (US)

( * ) Notice: Subject to any disclaimer, the term of this patent is extended or adjusted under 35 U.S.C. 154(b) by 455 days.

(21) Appl. No.: 16/692,682

(22) Filed: Nov. 22, 2019

(65) Prior Publication Data

US 2020/0171590 A1    Jun. 4, 2020

Related U.S. Application Data

(60) Provisional application No. 62/773,650, filed on Nov. 30, 2018.

(51) Int. Cl.
*B23D 59/02* (2006.01)

(52) U.S. Cl.
CPC .................... *B23D 59/02* (2013.01)

(58) Field of Classification Search
CPC ......... B26D 7/088; B26D 7/225; B23D 59/02
See application file for complete search history.

(56) References Cited

U.S. PATENT DOCUMENTS

| | | | |
|---|---|---|---|
| 3,654,972 A | 4/1972 | Pryor | |
| RE30,598 E | 5/1981 | Spencer | |
| 4,265,361 A * | 5/1981 | Schroeder | B65H 35/02 209/912 |
| 4,813,319 A * | 3/1989 | Weyand, Jr. | B29D 30/46 83/56 |
| 5,406,869 A * | 4/1995 | Prochnow | B26D 7/20 83/477.2 |
| 5,557,997 A | 9/1996 | Wunderlich et al. | |
| 5,839,335 A * | 11/1998 | Tilley | B23D 59/02 184/104.1 |
| 5,911,849 A * | 6/1999 | Bradshaw | B26F 1/40 156/264 |
| 6,123,002 A | 9/2000 | Wunderlich et al. | |

(Continued)

FOREIGN PATENT DOCUMENTS

| | | |
|---|---|---|
| CN | 201456103 U | 5/2010 |
| WO | 1999015448 A1 | 4/1999 |

(Continued)

OTHER PUBLICATIONS

International Search Report and Written Opinion for PCT/US2019/063022 dated Feb. 6, 2020.

*Primary Examiner* — Ghassem Alie
*Assistant Examiner* — Samuel A Davies
(74) *Attorney, Agent, or Firm* — Thompson Coburn LLP

(57) ABSTRACT

A method of cleaning a blade of a log saw of a converting line comprises applying a cleaning agent to a saw blade. The saw blade is adapted to cut a log of web material into rolls as the log of web material advances on a conveyor. In an another step of the method the log is advanced on the conveyor for cutting with the saw blade. In another step of the method, the saw blade is cleaned by cutting the log with the saw blade with the cleaning agent applied to the saw blade.

16 Claims, 1 Drawing Sheet

(56) References Cited

U.S. PATENT DOCUMENTS

| | | | |
|---|---|---|---|
| 7,823,754 B1 | 11/2010 | Tilley | |
| 7,946,205 B2* | 5/2011 | Benvenuti | B26D 7/1818 |
| | | | 83/167 |
| 10,272,585 B1 | 4/2019 | Chike et al. | |
| 10,478,988 B2 | 11/2019 | Chike et al. | |
| 2002/0117030 A1 | 8/2002 | Gambaro et al. | |
| 2004/0244549 A1* | 12/2004 | Mitchell | B26D 7/0683 |
| | | | 83/13 |
| 2009/0095379 A1 | 4/2009 | Barker | |
| 2011/0132165 A1 | 6/2011 | Dale | |
| 2012/0297949 A1* | 11/2012 | Ono | B23D 47/04 |
| | | | 83/209 |
| 2015/0059545 A1 | 3/2015 | Paulson et al. | |
| 2015/0208712 A1 | 7/2015 | Gilardi et al. | |

FOREIGN PATENT DOCUMENTS

| | | |
|---|---|---|
| WO | 2002051602 A1 | 7/2002 |
| WO | 2018071247 A1 | 4/2018 |

* cited by examiner

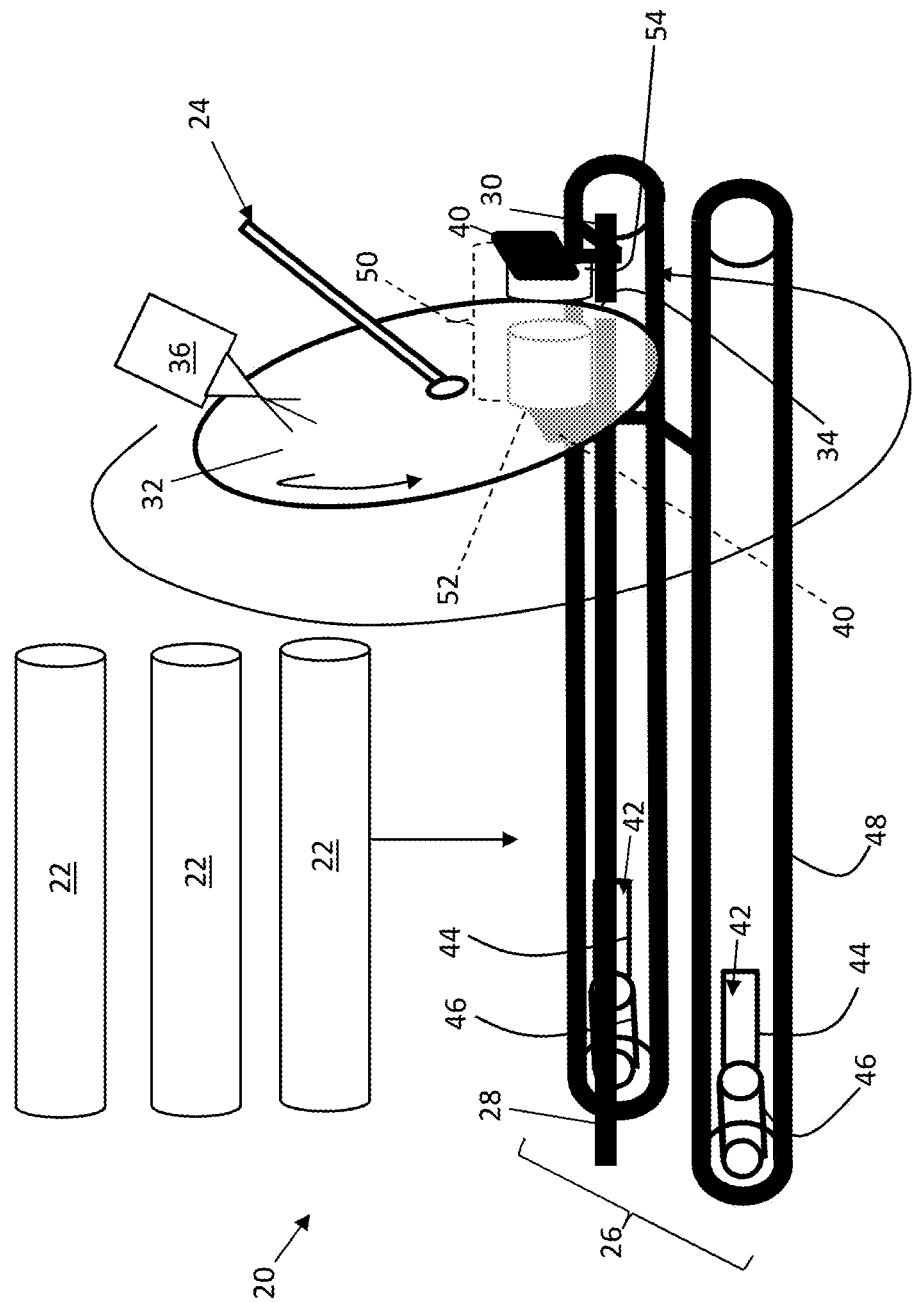

METHOD OF CLEANING BLADE OF LOG SAW

RELATED APPLICATION DATA

This application claims the benefit of U.S. provisional application Ser. No. 62/773,650, filed Nov. 30, 2018, the disclosure of which is incorporated by reference herein.

BACKGROUND AND SUMMARY

This disclosure is directed to a saw for cutting logs of web material into rolls, whether the logs are wound convolutely on a core or coreless. In a general sense and as further modified as described below, the saw system may be of the type, for instance, as shown by way of example and not in any limiting sense, in U.S. RE30,598, U.S. Pat. Nos. 5,557, 997, and 6,123,002, the disclosures of which are incorporated by reference herein. The saw system may be integrated with a conveyor system, for instance, as shown by way of example and not in any limiting sense, in U.S. Pat. No. 10,272,585 and 10,478,988, the disclosures of which is incorporated by reference herein. The saw system may also be integrated with a saw blade storage array system, for instance, as shown by way of example and not in any limiting sense, in co-pending U.S. application Ser. No. 16/109,028, filed Aug. 22, 2018, the disclosure of which is incorporated by reference herein. The saw system may be integrated with a trim elimination system, for instance, as shown by way of example and not in any limiting sense, in U.S. Pat. No. 6,332,527, the disclosure of which is incorporated by reference herein.

Saw blades for cutting logs typically require cleaning of accumulated fiber, glue and other chemicals used in paper manufacturing and converting, along with grind stone grit and metal from the sharpening of the saw blade. Saw blades are typically cleaned by spraying the blade surface with a cleaner and then manually wiping the surface with a paper towel. Because the blade edge is extremely sharp, the process of cleaning can be hazardous to an operator manually cleaning the blade.

The disclosure is directed to a method of cleaning the saw blade without operator intervention to reduce and potentially eliminate the need to expose an operator to the hazard of the manual blade cleaning operation.

DESCRIPTION OF THE DRAWINGS

FIG. 1 is a schematic drawing of an exemplary conveyor system and saw system that may utilize the methods described herein.

DETAILED DESCRIPTION

In one aspect of the disclosed method, the saw system may be provided with a saw blade cleaner application system. The saw blade cleaner application system may be provided as a separate system to the saw blade lubrication application system currently used on many saw systems for lubricating the saw blades during cutting operations. In the alternative, the cleaner application system may be integrated with the lubrication application system, with the application system configured and adapted to switch between supplying lubricant and cleaner to the saw blade surface. In the alternative, the lubricant application system may be adapted and configured to provide blade lubricant in quantities, as needed depending upon the operation, to enable sufficient lubrication of the blade, and sufficient cleaning of the blade thereby allowing one agent or media to be used with the methods described below. The lubricant and/or cleaner may be a fluid, solid or a gel.

In another aspect of the method, during operating of the saw system in a normal log cutting process producing rolls, the saw blade may be inspected to determine whether the saw blade is in need of cleaning. This may be performed via a machine vision system inspecting the saw blade surface, or via analysis of one or more operating parameters associated with the log cutting process, including parameters related to the appearance of the face cut of the resultant roll and/or log, the width or the angle of the cut on the resultant roll and/or log, and/or temperature or torque loading on the saw blade. The analysis of the operating parameters associated with the log cutting process may be via manual inspection methods or feedback from machine (e.g., saw system, conveyor system) operating parameters, and may be intermittent or continuous depending upon the parameter. A vision system may include a Banner Engineering Smart Camera model VE201G1A provided by Banner Engineering Corp. of Minneapolis, Minn., US.

When it is determined that the saw blade requires cleaning, the saw system may be configured to temporarily suspend the normal log cutting process producing rolls and perform a blade cleaning cycle. In suspending the normal log cutting process, the advancement of a log or logs in the log conveyor may be halted. In performing the cleaning cycle, the saw system may be enabled to apply cleaner to the surface of the saw blade from the application system, which may be a dedicated cleaner application system, integrated cleaner/lubricant system, or lubricant from the lubricant system. In one example, the step may be performed by applying a spray of liquid cleaner on the saw blade from a dedicated cleaner application system.

Thereafter, the conveyor system may be configured to advance a log for cutting with the saw blade. In a multi-lane conveyor system, the conveyor system may be configured to enable one lane to advance a log for log cutting. The conveyor system may then advance the log to allow the saw system to make wiping or cleaning cuts in the advanced log. The conveyor and saw systems may be interfaced as necessary to carry out coordinated operations for the cleaning cycle. The conveyor system may be configured to advance the log a distance sufficient for the blade to make a penetrating cut on the log for purposes of cleaning the blade. The distance of log advancement in the lane during the cleaning cycle may be less than the distance required to produce a roll during normal cutting operations. The saw system may be configured to plunge the rotating saw blade with the applied cleaner thereon partly through or completely through the log for as long and deep as necessary to clean the blade. Prior to the wiping or cleaning cut, the blade may be rotated for a period with the cleaner applied to the blade to allow contaminants and the cleaner to migrate toward the outer edge of the blade by centrifugal force. In this way, more of the face of the blade may be cleaned than the portion that passes through the log during the cleaning cut. The dwell time in the cut may be set as needed to clean the blade. The portion of the log cut during the cleaning cycle may be culled by the trim elimination system typically used on the conveyor system and/or saw system.

The cleaning cycle may be completed as many times as necessary to adequately clean the blade. In repeating the cleaning cycle, the saw system may be configured to move the blade to a position where the cleaner may be reapplied to the surface of the blade. The saw system may be configured to reapply cleaner as necessary. The amount of cleaner applied to the saw blade by the application system may be controlled automatically or manually by the operator. As described above, the blade may be rotated for a period after the cleaner is applied to the blade to allow contaminants and cleaner to migrate toward the outer edge of the blade by centrifugal force prior to plunging the blade in the log for the cleaning cut. In repeating the cleaning cycle, the conveyor may be configured to advance a log forward for purposes of cleaning the blade in the repeat cleaning cycle. As mentioned before, the distance of log advancement in the lane during the repeat cleaning cycle may be less than the distance required to produce a roll during normal cutting operations, and the saw system may be configured to plunge the rotating saw blade with the applied cleaner partly through or completely through the log for as long as necessary to clean the blade in the repeat cycle. The dwell time in the cut may be set as needed to clean the blade in the repeat cycle. The portion(s) of the log cut during the repeat cleaning cycle may be also culled by the trim elimination system.

After performing the cleaning cycle, or the repeat cleaning as the case may be, the saw system may be adapted and configured to resume normal log cutting operations. The conveyor system may be adapted and configured to advance logs toward the saw blade for cutting in a normal saw cutting process.

As described above, in a multi-lane conveyor, to minimize the amount of log portions cut during the cleaning cycle, the conveyor system may be configured to enable one lane to advance a log for the cleaning cuts. When a cleaning cycle is predicted, only one lane of multiple lane conveyor may be loaded with a log, and the conveyor system may enable the lane to advance the log as necessary to the saw blade for cleaning. The saw system and conveyor system may be configured so that the cleaning cycle is performed at the trailing end of a log. In this manner, the trailing end portions of the log may be used for the cleaning process and culled from the conveyor via the trim elimination system, and normal log cutting processes may begin with the next successive log. To further minimize waste, the distance of log advancement during the cycling cycle for the cleaning cuts may be much less than the distance for normal production rolls. For instance, in the case of bath tissue, instead of the typical 100 mm cut length, the cleaning cuts could be 33 mm. In this example, the reduction in log advancement distance would allow three cleaning cut blade passes in the final roll of the log with some trim, and potentially only culling one roll from the log.

In a slight variation of the method of using the trailing end of one log for the cleaning cut, all of the lanes of the multiple lane conveyor may be loaded with logs, and all of the lanes may be advanced for cutting rolls in normal log cutting operations until the trailing portion of each log is in position to allow performance of a cleaning cycle. If, after each cleaning cycle, it is determined that a repeat cleaning cycle is needed, a second trailing portion of each log may be advanced into position for the cleaning cycle. Once no further cleaning cycles are needed, any remaining trailing portions of sufficient length may be cut into rolls in accordance with normal log cutting operations.

Along with cut length and depth, the cleaning cycle may include other adjustments to optimize the process. By way of example and not in any limiting sense, a rotational speed of the saw blade and/or an orbital cut speed of the head of the saw blade may be adjusted as necessary to allow adequate cleaning of the saw blade. A high rotational speed for the saw blade and low orbital cut speed for the head would tend to keep the blade wiping on the log longer. In addition or alternative to rotational blade speed and orbital cut speed, a diameter on an outfeed clamp of the conveyor system may be adjusted. In one example, by tightening the outfeed log clamp or outfeed peripheral log constraint, the force exerted by the log pusher would increase causing the log to press harder on the blade which may be advantageous for cleaning. In a like manner, on a conveyor system with a variable flight length or independent pusher controls (for instance, as described in co-pending U.S. application Ser. No. 15/919,424), the lane control may be configured to enable the drive to advance one pusher against the rear of the log and to enable the drive for another pusher to push the same log in the opposite direction from the front of the log. This would cause the both sides of the log to press against the blade which may be advantageous for cleaning. As mentioned above, depth of cut may also be adjusted to optimize cleaning. Depending upon the condition of the blade, during the cleaning cycle, the saw system may be configured to plunge the blade deeper through the log to clean more of the blade near the center. The saw system may also be configured to plunge the blade less distance and not through the log. This would keep the blade edge in contact with the log for a longer period and minimize the number of log portions (i.e., loose pieces) to cull with the trim elimination system.

The cleaning cycle may be automatically initiated based on the number of normal operational cuts performed and/or rolls produced. The cycle may also be performed at advantageous times when normal production is paused by downstream processes, for instance, a full or nearly full accumulator, or by upstream processes, for instance, when an accumulator is empty or nearly empty. Utilizing such periods of idle time may allow for blade cleaning while maximizing throughput of the line.

The cleaning cycle could also be coupled to a blade sharpening sequence. The cleaner used on the blade may also be transferred to the grinding wheels used for sharpening to clean contaminants on the stone surfaces of the grinding wheels.

The cleaning cycle may be performed prior to a blade exchange sequence as described in co-pending U.S. application Ser. No. 16/109,028, so that the expired blade is cleaned as described above before being transferred to the storage unit of the blade storage array.

FIG. 1 shows an exemplary saw system and conveyor system that may be configured to use the techniques described herein. While the drawings show a conveyor system having independently controlled pushers, the principles disclosed herein may be performed using a conveyor system with a different pusher control or a multi-lane conveyor.

FIG. 1 shows an exemplary conveyor system 20 for advancing tissue logs 22, for instance, for cutting in a saw system 24. The conveyor system 20 may include one lane 26 or have a plurality of lanes extending side by side. The lanes 26 may comprise a trough-like structure dimensioned to support the bottom and side surfaces of the tissue log 22 to be processed with an open top to allow the log to be deposited or received in the lane. The lane 26 may have a receiving end 28 and an opposite discharge end 30 and a length extending between the receiving end and the discharge end. The lane 26 may be configured to receive a tissue log 22 in the lane at the receiving end 28 of the lane. For instance, each lane may be configured to receive a tissue log from an accumulator (not shown) associated with a tissue winding machine. The lane 26 may be configured to discharge the tissue log 22 from the discharge end 30 of the lane. The discharge end 30 of the lane may be configured to expose tissue logs in the lane to a blade 32 of the log saw 24. For instance, a gap 34 may be provided in lane adjacent to the discharge end 30 of the lane to allow the blade 32 of the log saw 24 to pass therethrough. The saw system 24 may be provided with cleaner application system 36, which may be integrated with or combined with the blade lubrication system as previously described.

Each lane 26 may be provided with at least one log advancement member 40. The log advancement member 40 may comprise a paddle-like pusher configured to engage an axial end of the tissue log 22 at the receiving end 28 of the lane and push the tissue log toward the discharge end 30 of the lane and the log saw 24 with the axially opposite end of the tissue log passing through the path of the blade 32 of the log saw first. The log advancement member 40 may move between a starting position in which the log advancement member is positioned in the lane so as to allow the tissue log 22 to be received in the lane at the receiving end 28 of the lane from the upstream processing source, for instance, the accumulator 29, and a finish position in which the log advancement member advances the tissue log to the discharge end 30 of the lane and past the path of travel of the blade 32 of the log saw 24 across the lane, as applicable, so as to allow the last segment of the tissue log to be cut and for the cleaning cycle to be performed on the trailing edge of the log 22.

A drive 42 may be provided to move the log advancement member between the starting and finish position. One or more log advancement members 40 may be associated with a drive. For instance, in the embodiment shown in the drawings, the drive 42 may comprise a motor 44 and transmission 46 for rotating a continuous loop 48 on which one log advancement member 40 is connected. The drive motor 44 may be a servo motor, and the transmission 46 may include a drive belt and a sprocket or wheel for driving the continuous loop 48 on which the log advancement member 40 is connected. Each lane 26 may be provided with two or more continuous loops 48 and two or more corresponding drives 42 with at least one log advancement member 40 fixed in position on each of the continuous loops.

As described above, the conveyor system 20 and saw system 24 may be integrated to allow a cleaning cycle to be performed by applying cleaner to the saw blade 32 and plunging the rotating blade into a trim piece 50 of a log. In particular, FIG. 1 shows an embodiment where the conveyor system controls are configured to operate the drive 42 to advance one pusher against the rear of a trailing end 52 of the trim piece 50 and to enable the drive for another pusher to push the opposite end 54 of the trim piece in the opposite direction from the front of trim piece of the log. With the saw blade 32 plunged into the log 22, the pushers apply force against the log and against the blade for cleaning. FIG. 1 shows the cleaning cut being performed on the terminal end of the trim piece of the log 22. In the alternative, the blade cleaner may be applied to a surface of the log.

Further embodiments may be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A method of operating a saw wherein the saw has a saw blade that is adapted and configured to cut a log of web material into rolls as the log of web material advances on a conveyor during a normal log cutting process, the method comprising:
    suspending the normal log cutting process producing rolls from the log of web material;
    applying a cleaning agent to the saw blade;
    advancing the log on the conveyor for cutting with the saw blade;
    cleaning the saw blade by cutting a portion of the log with the saw blade with the cleaning agent applied to the saw blade;
    discarding the portion of the log cut by the saw blade with the cleaning agent applied to the saw blade; and
    resuming the normal log cutting process producing rolls from the log of web material after discarding the portion of the log cut by the saw blade with the cleaning agent applied to the saw blade.

2. The method of claim 1 wherein the step of cleaning the saw blade by cutting the log with the cleaning agent applied thereto comprises varying a dwell time of the saw blade in the log during cutting the log.

3. The method of claim 1 wherein the step of cleaning the saw blade by cutting the log with the cleaning agent applied thereto comprises varying a rotational speed of the saw blade in the log during cutting the log.

4. The method of claim 1 wherein the step of cleaning the saw blade by cutting the log with the cleaning agent applied thereto comprises varying a depth of cut of the saw blade in the log.

5. The method of claim 1 wherein the step of cleaning the saw blade by cutting the log with the cleaning agent applied thereto comprises applying an axial force to the log during cutting of the log.

6. The method of claim 5 wherein the step of applying the axial force to the log during cutting of the log includes increasing a clamping pressure of a clamp of the conveyor clamping an end of the log downstream of the saw blade.

7. The method of claim 5 wherein the step of applying the axial force to the log during cutting of the log includes urging the log into the saw blade during cutting of the log with a log advancement member of the conveyor.

8. The method of claim 7 wherein the step of applying the axial force to the log during cutting of the log includes opposingly urging the log into the saw blade during cutting of the log with a further log advancement member of the conveyor located downstream of the saw blade.

9. The method of claim 1 wherein the step of cleaning the saw blade by cutting the log with the cleaning agent applied thereto comprises varying a speed of travel of the saw blade in the log during cutting the log.

10. The method of claim 1 further comprising inspecting the saw blade prior to the step of applying the cleaning agent to the saw blade.

11. The method of claim 10 wherein the step of inspecting the saw blade comprises configuring a sensor to sense a surface condition of the saw blade.

12. The method of claim 1 further comprising inspecting a roll of the log prior to applying the cleaning agent to the saw blade.

13. The method of claim 1 further comprising inspecting the log prior to applying the cleaning agent to the saw blade.

14. The method of claim 1 wherein the step of advancing the log on the conveyor for cutting with the saw blade includes advancing the log a distance less than a distance of advancement of the log during the normal log cutting process.

15. The method of claim 1 wherein the step of cleaning the saw blade by cutting the log with the cleaning agent applied thereto comprises rotating the blade with the cleaning agent applied thereto for a period of time prior to cutting of the log with the saw blade.

16. A method further comprising determining a number of cutting cycles of the saw blade during the normal log cutting process of claim 1 and performing the steps of claim 1 when the number of cutting cycles exceeds a threshold number of cutting cycles.

* * * * *